June 17, 1930.                F. RAMPACHER                1,764,348
                        LOCOMOTIVE DRIVE MECHANISM
                          Filed May 12, 1928         3 Sheets-Sheet 1
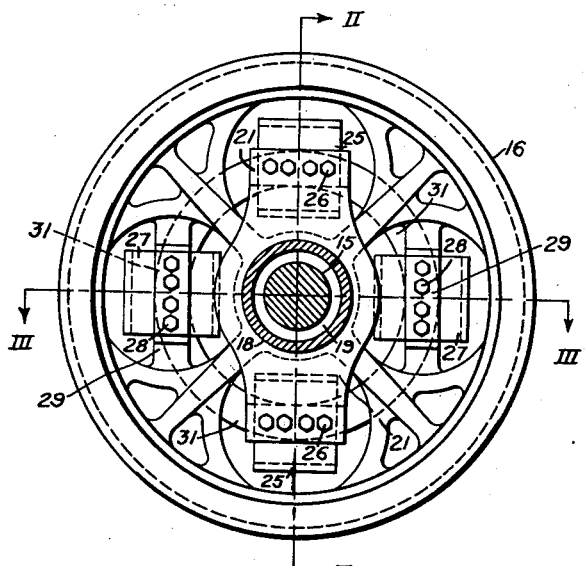
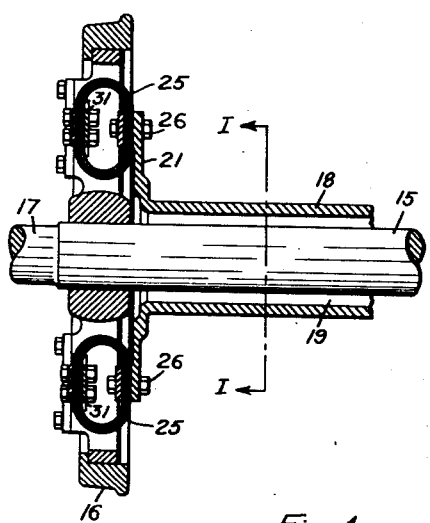
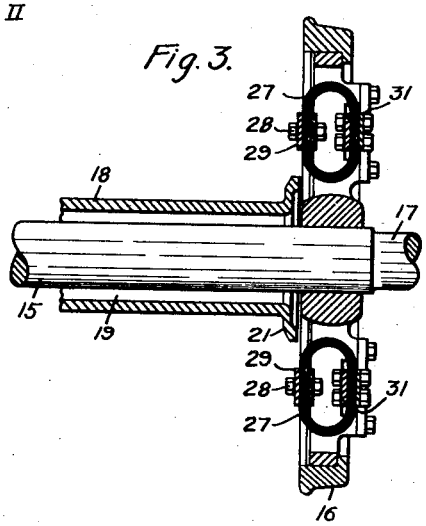
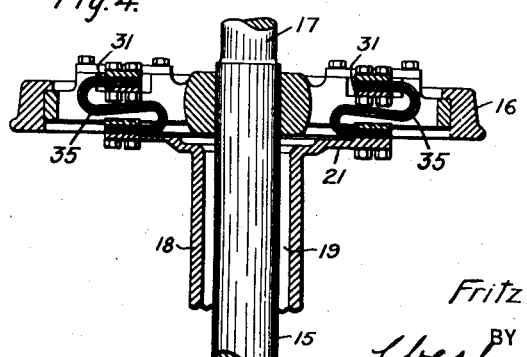
INVENTOR
Fritz Rampacher.
BY
ATTORNEY June 17, 1930. F. RAMPACHER 1,764,348
LOCOMOTIVE DRIVE MECHANISM
Filed May 12, 1928 3 Sheets-Sheet 2
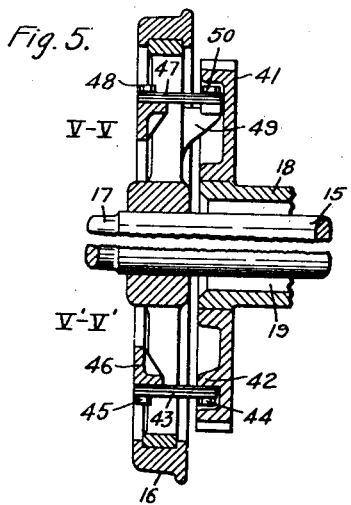
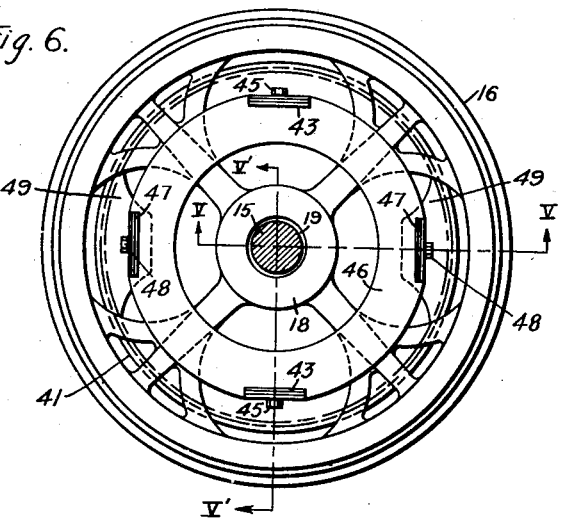
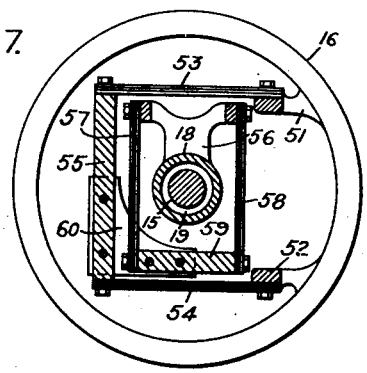
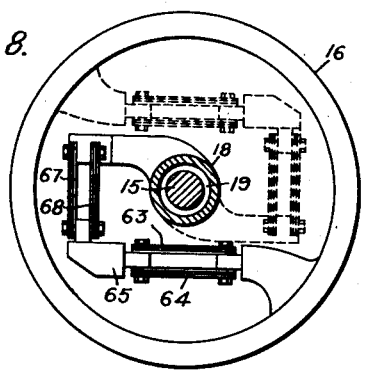
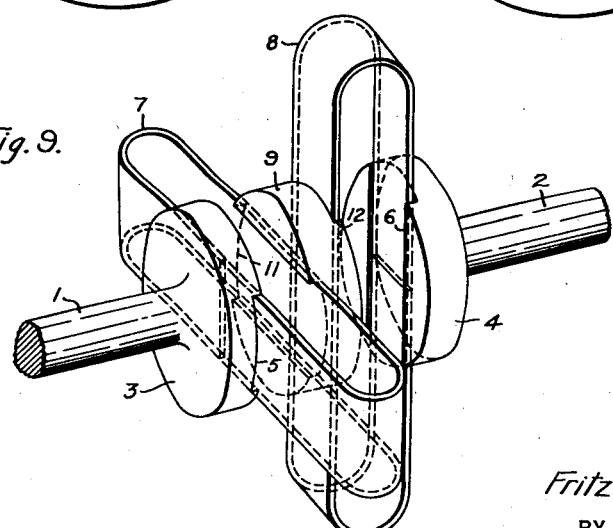
INVENTOR
Fritz Rampacher.
BY
ATTORNEY June 17, 1930.  F. RAMPACHER  1,764,348
LOCOMOTIVE DRIVE MECHANISM
Filed May 12, 1928  3 Sheets-Sheet 3
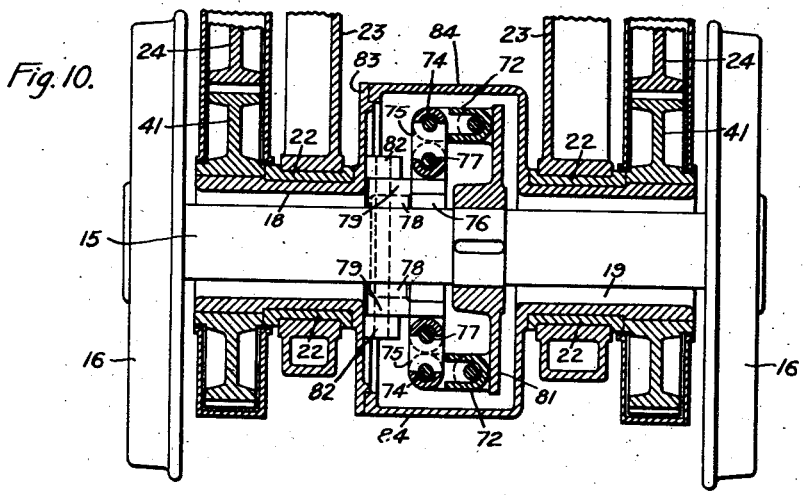
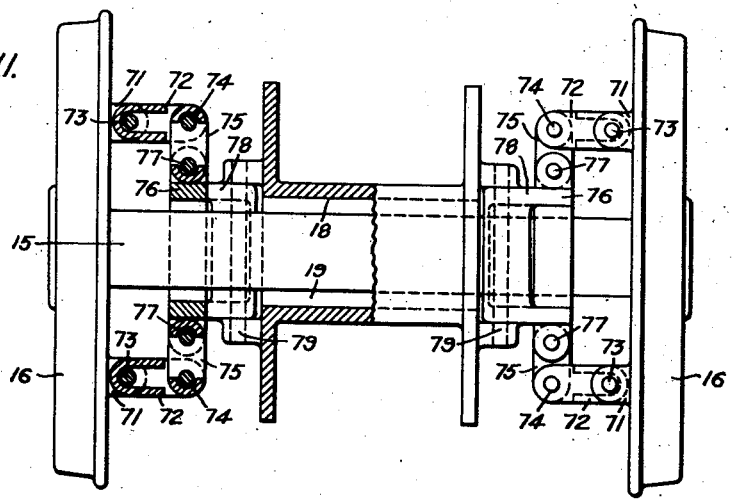
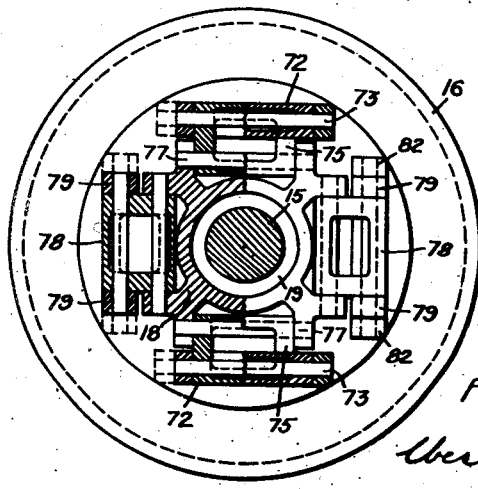
INVENTOR
Fritz Rampacher.
BY
ATTORNEY Patented June 17, 1930

1,764,348

UNITED STATES PATENT OFFICE

FRITZ RAMPACHER, OF BERLIN-CHARLOTTENBURG, GERMANY, ASSIGNOR TO WESTING-
HOUSE ELECTRIC & MANUFACTURING COMPANY, A CORPORATION OF PENNSYL-
VANIA

LOCOMOTIVE DRIVE MECHANISM

Application filed May 12, 1928, Serial No. 277,129, and in Germany May 13, 1927.

The invention relates, in general, to shaft-coupling devices and particularly to coupling means for use in connection with drive mechanisms for self-propelled railway vehicles.

In railway vehicles, it is desirable that the amount of weight which is rigidly carried by the wheel axles be as low as possible. In order to effect this end, it is common practice to provide self-propelled railway vehicles with hollow quill shafts which are journaled rigidly in the vehicle frame and disposed to surround the driving-wheel axles. The frame is resiliently supported on the wheel axles in the usual manner and a driving connection is effected between the quill shafts and the wheel axles by means of universal couplings.

It is an object of this invention to provide coupling means for axially disposed shafts that is simple, of light weight and disposed to permit axial and angular misalignment of the coupled shafts.

Another object of the invention is to provide coupling means for shafts comprising elements that are flexible in the radial direction and substantially rigid in the circumferential direction.

A further object of the invention is to provide coupling means for shafts comprising resilient members that are so disposed in relation to the shafts to be coupled that they are free to deflect to permit relative radial movement between the shafts and to resist circumferential displacement between them.

These and other objects of the invention will become apparent when the following specification, which describes the apparatus, is read in conjunction with the accompanying drawings, in which:

Figure 1 is a view, partially in end elevation and partially in cross-section, of a locomotive drive mechanism that embodies the principles of the invention, and is taken along the line I—I of Fig. 2.

Fig. 2 is a view, in longitudinal section, of the drive mechanism, taken along the line II—II of Fig. 1.

Fig. 3 is a view, in longitudinal section, of the drive mechanism, taken along the line III—III of Fig. 1.

Fig. 4 is a view, in longitudinal section, of a modification of the structure shown in Fig. 2.

Fig. 5 is a view, in longitudinal section, of another modification of the invention, taken along the line V—V and V'—V' of Fig. 6.

Fig. 6 is a view, in end elevation, of the modification shown in Fig. 5.

Fig. 7 is a diagrammatic view, in cross-section, of a further modification of the invention.

Fig. 8 is a diagrammatic view, in cross-section, of still another modification of the invention.

Fig. 9 is a perspective view of a coupling for shafts that illustrates the basic principles of the invention.

Fig. 10 is a view, in longitudinal section, showing an embodiment of the invention applied to another locomotive drive mechanism.

Fig. 11 is a view, partially in side elevation and partially in longitudinal section, of a modification of the drive mechanism shown in Fig. 10, and Fig. 12 is a view, partially in cross-section and partially in end elevation, of the drive mechanism shown in Fig. 11.

In the drawings, Fig. 9 illustrates a simple embodiment of the invention that may be referred to, to best illustrate the principles that are involved. As shown, the device comprises coupling means for transmitting torque between the ends of shafts 1 and 2 that are in substantially axial alignment. The shafts 1 and 2 are provided, at their end, with flanges 3 and 4, respectively, which have transverse recesses 5 and 6. The recesses 5 and 6 are for receiving the end plates of oval shaped springs 7 and 8.

In mounting the springs 7 and 8, the ends are brought together within the recesses 5 and 6 and may be secured to the flanges 3 and 4 by rivets or other suitable means. In order to provide a connection between the shafts 1 and 2, a disc member 9 is disposed between the springs 7 and 8 and is provided with grooves or recesses 11 and 12 that are disposed on the respective faces of the disc and at right angles to each other for the purpose of receiving the portions of the springs 7 and 8 that are diametrically opposite the ends which are in engagement with the flanges 3 and 4.

It will be readily apparent that, with the springs 7 and 8 disposed at right angles to each other, as shown in Fig. 9, the spring 7 will permit angular misalignment between the shafts 1 and 2 in a horizontal plane and the spring 8 will permit angular misalignment in a vertical plane. Inasmuch as any condition of angular misalignment may be resolved into misalignment in two planes, it is clear that the coupling shown in Fig. 9 is adapted to permit angular misalignment between the shafts 1 and 2 in any direction and within a limited range. Likewise, it is clear that the spring 7, as shown, will permit radial displacement of the shaft 1 relative to the shaft 2 in a horizontal plane and the spring 8 will permit radial displacement of the shafts 1 and 2 in a vertical plane within certain limits. Therefore, the shafts 1 and 2 may be displaced radially, relative to each other in any direction, as well as, or in addition to, being displaced in angular relation. It is further obvious that, because of the elliptical shape of the springs 7 and 8, the shafts 1 and 2 may be displaced in an axial direction relative to each other. However, inasmuch as the planes within which the springs 7 and 8 are disposed to deflect remain at all times at right angles to the plane of rotation of the coupling, it is apparent that substantially no tangential displacement is permitted between the shaft 1 and the shaft 2.

It may, therefore, be concluded that the elementary coupling shown in Fig. 9 is adapted to transmit torque between the shafts 1 and 2 under any possible conditions of misalignment between the shafts, within certain limits, and with substantially rigid circumferential connection therebetween.

Referring now to Figs. 1, 2 and 3, the coupling device is there shown in a form that may be applied to a drive mechanism for railway vehicles. The portion of a standard railway running gear that is shown in these views comprises a wheel axle 15 that is provided, at its ends, with track wheels 16 and with outside journals 17. Surrounding the wheel axle 15 is a hollow quill shaft 18 that is of sufficient internal diameter to provide a clearance space 19 between it and the wheel axle 15 to permit relative angular or radial displacement therebetween. The quill shaft 18 is provided, at its ends, with flange members 21 each of which comprises two broad arms extending radially from diametrically opposite sides.

In order to provide means for transmitting power from the quill shaft 18 to the track wheels 16 and, at the same time, provide for limited relative motion between the shaft 18 and the wheel axle 15 in any longitudinal plane, flat spring members 25, that have been bent into a tubular shape having an oval cross section, are secured, by means of bolts 26, to the ends of the arms of the flanges 21 with their longitudinal axes disposed tangential to a circle concentric with the quill shaft and the wheel axle. A similar pair of tubular spring members 27 are secured, by means of bolts 28, to web members 29 that extend between spokes of the wheels 16, as shown in Figs. 1 and 3. In order to effect the transmission of power from the springs 25 to the springs 27, the pairs of springs are disposed at right angles to each other and are secured to an annular intermediate member 31 that is axially mounted within the track wheels 16.

From the explanation of the coupling device given in connection with Fig. 9, it may be readily seen that, inasmuch as the pairs of springs 25 and 27 are disposed at right angles to each other, relative motion between the wheel axle 15 and the quill shaft 18 may occur in any axial plane within the limits of deflection of the springs. However, torque may be transmitted from the quill shaft 18 to the track wheels 16 with very little tangential displacement, inasmuch as the tubular spring members are relatively rigid in the direction parallel to their longitudinal axes.

In Fig. 4 is shown a modification of the drive mechanism shown in Fig. 2, the only essential difference being that the spring members 35, instead of being tubular, have a cross section that is of substantially S-shape. It is, therefore, apparent that a spring element having any suitable shape may be employed to transmit power from the quill shaft 18 to the gear wheels 16, so long as the resulting structure is substantially rigid in the circumferential direction and possesses the necessary resilience in an axial plane.

A more simple embodiment of the invention is shown in Figs. 5 and 6 which represent a locomotive drive mechanism embodying a wheel axle 15 upon which are mounted wheels 16 and which is surrounded by a cooperating quill shaft 18. The quill shaft 18 is provided, at its ends, with gear wheels 41 by means of which power is transmitted from a driving motor (not shown) to the track wheels 16. At diametrically opposite positions, each gear wheel 41 is provided with flanges 42 to each of which is attached one edge of a substantially square plate spring 43 by means of bolts 44. The opposite edges of the plate springs 43 are secured, by bolts 45, to annular intermediate members 46 that are disposed within the track wheel 16.

At diametrically disposed positions 90° removed from the positions occupied by the springs 43, a second pair of springs 47 are secured to the intermediate member 46 by bolts 48. The plate springs 47 are, in turn, secured to brackets 49 on the track wheel 16 by means of bolts 50, thereby providing a direct connection for transmitting power from the quill shaft 18 to the track wheel 16. It is apparent that the plate springs 43 and 47 function in a manner somewhat similar to the action of the tubular springs shown in Figs. 1, 2 and 3 to permit radial displacement between the quill shaft 18 and the wheel axle 15. Likewise, these springs will be substantially rigid in a circumferential direction for the purpose of transmitting torque.

In Figs. 7 and 8 are shown further modifications of the invention, in which relatively long plate springs are disposed within the track wheel 16 to extend in tangential directions. In Fig. 7, the track wheel 16 is provided with brackets 51 and 52 to which are secured two parallel plate springs 53 and 54 that are disposed on opposite sides of the wheel axle 15. The ends of the spring elements 53 and 54 that are farthest removed from the brackets 51 and 52 are connected by means of an intermediate bar member 55. The quill shaft 18, in this modification, is provided with a radially extending arm 56 to which are fastened parallel spring members 57 and 58 that extend on opposite sides of the quill shaft 18 in a direction at right angles to the position assumed by the springs 53 and 54. The springs 57 and 58 are similarly connected, at their ends, by an intermediate member 59 which is disposed at right angles to the intermediate member 55 and is secured thereto by means of a bracket 60.

In the construction shown in Fig. 8, the parallel springs 63 and 64 that correspond to the springs 53 and 54 shown in Fig. 7 are both disposed on the same side of the quill shaft 18 and are connected, by a rigid intermediate member 65, to parallel springs 67 and 68 that correspond to the springs 57 and 58 in Fig. 7. This structure may be duplicated, as shown by the dotted lines in Fig. 8, in order that the coupling mechanism may be inherently balanced.

The flexible connection between the quill shaft 18 and the wheel axle 15 may also be effected by means of pinned links or chains, as shown in Figs. 10, 11 and 12. In Fig. 11, the driving wheel 16 is provided with diametrically disposed brackets 71 to which are connected link members 72 that extend parallel to the wheel axle 15 and are pivoted on pins 73 that are disposed parallel to each other and perpendicular to a plane passing through the axis of the wheel axle 15. The links 72 are further pivoted, by means of pins 74, to radially disposed links 75 that are, in turn, pivoted to an intermediate member 76 by means of pins 77.

It will be observed that the pins 73, 74 and 77 are all substantially parallel and are disposed to permit motion of the intermediate member 76 in a vertical axial plane, as shown in Fig. 11. The intermediate member 76 is also connected to the quill shaft 18 by means of a second set of pin-connected links 78 and 79 that are similar to the link system just described and that permit motion of the intermediate member 76 relative to the quill shaft 18 in a plane at right angles to the plane in which the intermediate member 76 is free to move relative to the wheel axle 15.

It is apparent that the link coupling shown in Figs. 11 and 12 is adapted to function in the same manner as the coupling shown in elementary form in Fig. 9. Inasmuch as each set of link members permits limited motion in one plane and the two sets of links are disposed in planes at right angles to each other, it follows, as heretofore explained, that the quill shaft 18 is free to perform limited movement with respect to the wheel axle 15 in any direction, except circumferential, with respect thereto.

The drive mechanism shown in Fig. 10, comprises the usual quill shaft 18 that is rigidly journaled, by means of bearings 22, in locomotive-side-frame members 23 and is provided, at its ends, with gear wheels 41 for meshing with pinions 24 on a driving motor (not shown). In this modification, power is transmitted from the quill shaft 18 to the wheel axle 15 by means of a coupling mechanism that is disposed in the central longitudinal plane of the vehicle. As shown, the wheel axle 15 is provided with a flange member 81 near its center portion for the purpose of pivotally supporting the link members 72 and 75, in a manner similar to the way in which they are connected to the track wheel 16 in Fig. 11. The intermediate member 76 is, in this instance, connected, by means of the links 78 and 79, to lugs 82 that are formed integrally with a flange member 83 upon the quill shaft 18. The entire coupling is enclosed within an enlargement of the quill shaft 18 that constitutes a housing 84.

From the foregoing explanation of the various modifications illustrated, it is apparent that the invention provides coupling means for shafts that is adapted to permit limited universal movement between the coupled shafts in any axial plane and is disposed to transmit torque between the shafts without appreciable circumferential displacement.

Although the specification has set forth several embodiments of the invention, it will be obvious to those skilled in the art of power transmission that various modifications may be made in the details of design and in the arrangement of the various parts of the coupling mechanism without departing from the spirit and scope of the invention as defined in the appended claims.

I claim as my invention:

1. A locomotive drive mechanism comprising a wheel axle, a quill shaft carried by the wheel axle, an intermediate member disposed to transmit power from the quill shaft to the wheel axle and means for connecting said intermediate member to the quill shaft and to the wheel axle, said connecting means comprising members that are flexible in the radial direction and substantially rigid in the circumferential direction.

2. A locomotive drive mechanism comprising a wheel axle, a quill shaft carried by the wheel axle, an intermediate member disposed to transmit power from the quill shaft to the wheel axle and means for connecting said intermediate member to the quill shaft and to the wheel axle, said connecting means comprising link members that are disposed to bend in the radial direction and are substantially rigid circumferentially.

3. A locomotive drive mechanism comprising a wheel axle, a quill shaft carried by the wheel axle, an intermediate member disposed to transmit power from the quill shaft to the wheel axle and means for connecting said intermediate member to the quill shaft and to the wheel axle, said connecting means comprising resilient elements so disposed that they are free to deflect when the quill shaft is moved radially with respect to the wheel axle but are substantially rigid in the circumferential direction.

4. In a locomotive drive mechanism, in combination, a wheel axle, wheels on the wheel axle, a quill shaft surrounding the wheel axle and coupling means for transmitting power from the quill shaft to the wheel axle, said coupling means comprising resilient members secured to the quill shaft, a rigid intermediate member carried by the resilient members, a second set of resilient members mounted on the intermediate member and secured to the wheel axle, said resilient members being substantially rigid circumferentially.

5. A locomotive drive mechanism comprising a wheel axle, a quill shaft surrounding the wheel axle and coupling means for transmitting power between the quill shaft and the wheel axle, said coupling means comprising resilient members so disposed that they are substantially rigid circumferentially.

6. A drive mechanism comprising, in combination, a drive shaft and a driven shaft, an intermediate member disposed to transmit power between the shafts, and means for connecting said intermediate member to the drive shaft and to the driven shaft, said connecting means comprising members that are flexible radially of the shafts and substantially rigid circumferentially of the shafts.

In testimony whereof, I have hereunto subscribed my name this 20th day of April, 1928, at Berlin-Siemensstadt, Germany.

FRITZ RAMPACHER.